(12) United States Patent
Haugsjaahabink

(10) Patent No.: US 8,919,094 B2
(45) Date of Patent: Dec. 30, 2014

(54) FUEL METERING SYSTEM

(75) Inventor: Todd Haugsjaahabink, Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 435 days.

(21) Appl. No.: 13/454,844

(22) Filed: Apr. 24, 2012

(65) Prior Publication Data

US 2013/0276918 A1 Oct. 24, 2013

(51) Int. Cl.
*F02C 7/232* (2006.01)
*F02C 9/26* (2006.01)

(52) U.S. Cl.
USPC ............. 60/39.281; 60/734; 137/115.03; 137/115.13; 137/487.5

(58) Field of Classification Search
CPC ............ F16K 17/00; G05D 7/005; F02C 7/22
USPC ............... 137/115.03, 115.13, 487.5
See application file for complete search history.

(56) References Cited

U.S. PATENT DOCUMENTS

| | | | | |
|---|---|---|---|---|
| 6,401,446 B1 * | 6/2002 | Gibbons | ............ | 60/39.281 |
| 7,131,274 B2 * | 11/2006 | Baryshnikov et al. | ......... | 60/772 |
| 7,966,994 B2 * | 6/2011 | Kleckler | ............ | 123/510 |
| 2005/0166573 A1 * | 8/2005 | Hommema | ............ | 60/39.281 |
| 2005/0223690 A1 * | 10/2005 | Wernberg et al. | ......... | 60/39.281 |
| 2005/0279079 A1 | 12/2005 | Baryshnikov et al. | | |
| 2006/0080961 A1 | 4/2006 | Paradise | | |
| 2007/0151333 A1 | 7/2007 | Paradise | | |

FOREIGN PATENT DOCUMENTS

| | | |
|---|---|---|
| EP | 2124123 A2 | 11/2009 |
| GB | 2256729 A | 12/1992 |
| WO | 02001055 A1 | 1/2002 |

OTHER PUBLICATIONS

GB Search Report for Application No. GB1307276.4, Mailed on Oct. 31, 2013. 4 pages.

* cited by examiner

*Primary Examiner* — Eric Keasel
*Assistant Examiner* — Josephine Trinidad-Borges
(74) *Attorney, Agent, or Firm* — Cantor Colburn LLP

(57) ABSTRACT

A fuel metering system includes a bypass valve configured to receive a fuel flow under a pressure $P_1$, a pressure regulating valve in fluid communication with the bypass valve and configured to receive a fuel flow under a pressure $P_Q$, a metering valve in fluid communication with the bypass valve and the pressure regulating valve, and configured to receive the fuel flow under the pressure $P_1$ and to output a fuel flow under a pressure $P_2$, a single stage servo valve in fluid communication with the bypass valve, the pressure regulating valve and the metering valve, and configured to receive the fuel flow under the pressure $P_1$, and to output the fuel flow under the pressure $P_Q$, and to output a fuel flow under a pressure $P_M$, and a linear variable differential transformer coupled to the metering valve.

20 Claims, 1 Drawing Sheet

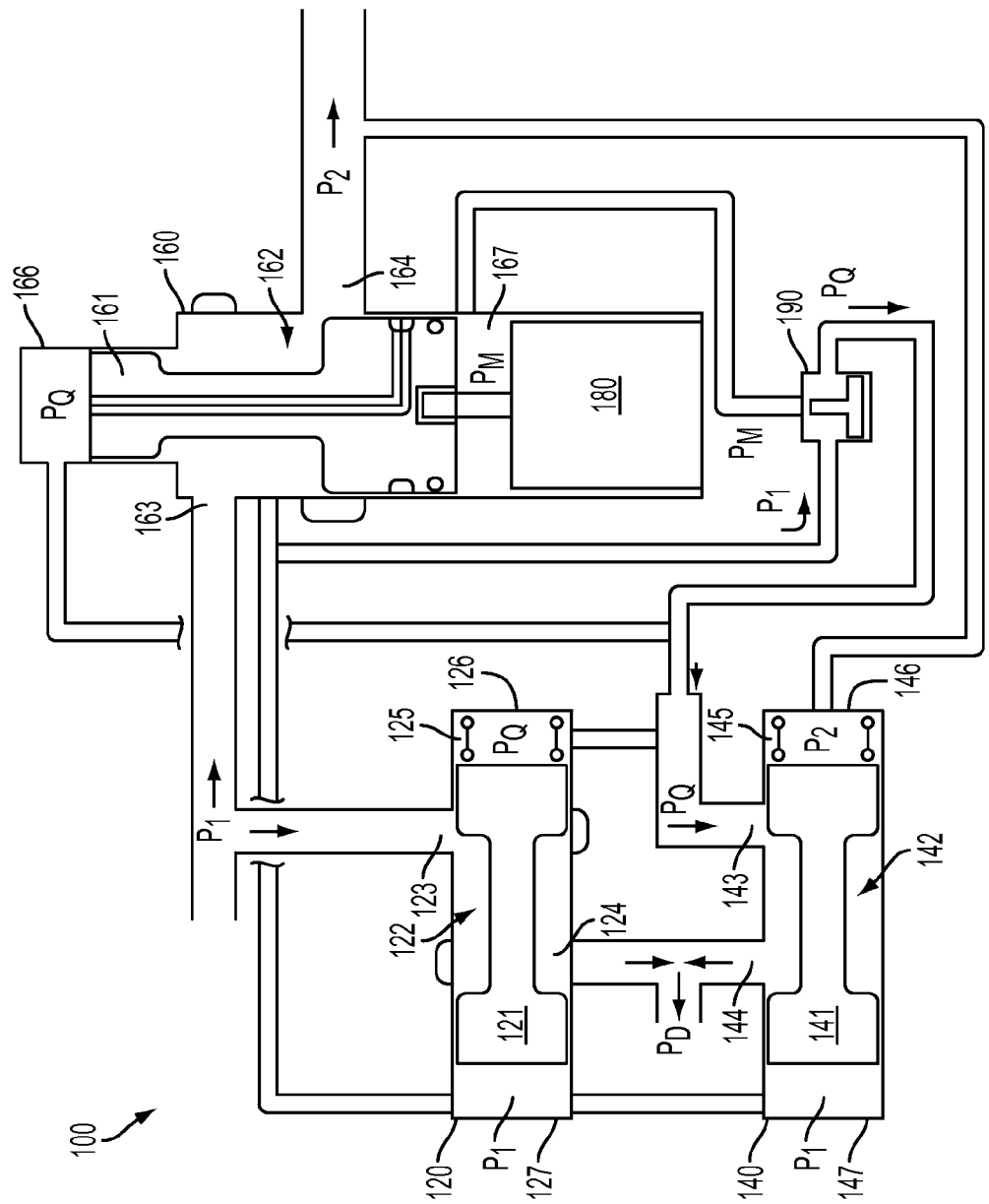

FUEL METERING SYSTEM

BACKGROUND OF THE INVENTION

The present invention relates to fuel metering systems, and more specifically, to a fuel metering system having multiple valves to reduce $P_1$-$P_2$ variations and thus improve metered flow accuracy.

A conventional fuel metering system includes a metering valve, and single stage servo valve, and a pressure regulating valve (whose job is to regulate metering window pressure ($P_1$-$P_2$) by bypassing excess pump flow), and a servo pressure regulating valve (whose job is to regulate servo pressure ($P_R$-$P_D$) across the single stage servo valve). Because of the large variations in bypass flow and system delta pressure ($P_1$-$P_D$), the regulation of $P_1$-$P_2$ can have significant variation. This variation is largely due to a large valve stroke introducing large spring force variations, and the large swing in $P_1$-$P_D$ causing large changes in fluid momentum forces. As such, there can be large variations in the pressure $P_1$-$P_2$, resulting in inaccuracies in metered flow within the system. In addition, the conventional metering valve has several signal pressures making it a very large and complex valve.

BRIEF DESCRIPTION OF THE INVENTION

Exemplary embodiments include a fuel metering system, including a bypass valve configured to receive a fuel flow under a pressure $P_1$, a pressure regulating valve in fluid communication with the bypass valve and configured to receive a fuel flow under a pressure $P_Q$, a metering valve in fluid communication with the bypass valve and the pressure regulating valve, and configured to receive the fuel flow under the pressure $P_1$ and to output a fuel flow under a pressure $P_2$, a single stage servo valve in fluid communication with the bypass valve, the pressure regulating valve and the metering valve, and configured to receive the fuel flow under the pressure $P_1$, and to output the fuel flow under the pressure $P_Q$, and to output a fuel flow under a pressure $P_M$, and a linear variable differential transformer coupled to the metering valve.

Further exemplary embodiments include a fuel metering system, including a bypass valve configured to receive a fuel flow under a pressure $P_1$, a pressure regulating valve in fluid communication with the bypass valve, a metering valve in fluid communication with the bypass valve and the pressure regulating valve, and configured to output a fuel flow under a pressure $P_2$, a single stage servo valve in fluid communication with the bypass valve, the pressure regulating valve and the metering valve and a linear variable differential transformer coupled to the metering valve, wherein the bypass valve and the pressure regulating valve regulate a pressure difference $P_1$-$P_2$ and contribute to a bypass fuel flow under a pressure $P_D$.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 illustrates an exemplary fuel metering system.

DETAILED DESCRIPTION OF THE INVENTION

FIG. 1 illustrates an exemplary fuel metering system 100. Similar to conventional fuel metering systems, the system 100 manages pressure changes between the incoming fuel pressure $P_1$ and the outgoing fuel pressure $P_2$. As described herein, variations of $P_1$-$P_2$ are reduced, thereby improving metered flow accuracy.

The system 100 includes a bypass valve (BV) 120 in fluid communication with a pressure regulating valve (PRV) 140. In one embodiment, the BV 120 includes a spool 121 disposed in an annular cavity 122 having an incoming pressure $P_1$ and having first window 123 and a second window 124, through which fluid flows at given pressures. A BV spring 125 provides a resilient force to the spool 121 in response to the applied pressures as further described herein. The BV spring 125 resides in a first cavity 126 on one side of the spool 121 and under a cavity pressure $P_Q$. A second cavity 127 is disposed on an opposite side of the spool 121, and has a pressure $P_1$.

In one embodiment, the PRV 140 includes a spool 141 disposed in an annular cavity 142 having an incoming pressure $P_Q$ and having first window 143 and a second window 144, through which fluid flows at given pressures. A PRV spring 145 provides a resilient force to the spool 141 in response to the applied pressures as further described herein. The PRV spring 145 resides in a first cavity 146 on one side of the spool 141 and under a pressure $P_2$. A second cavity 147 is disposed on an opposite side of the spool 141, and has a pressure $P_1$. The drain pressure $P_D$ comes from the second windows 124 and 144 of the BV 120 and PRV 140 respectively.

The system 100 further includes a metering valve (MV) 160 in fluid communication with the BV 120 and the PRV 140. The system 100 further includes a linear variable differential transformer (LVDT) 180 to provide position feedback, thereby enabling control of the valve stroke of the MV 160. The system 100 further includes a single stage servo valve 190 that provides pressure in different areas on the MV 160. The LVDT 180 provides MV 160 position and feedback to the Electronic Engine Control (EEC). The EEC then sends a signal to the single stage servo valve 190, which in turn provides pressure changes to the MV 160 to position the MV 160.

In one embodiment, the MV 160 includes a spool 161 disposed in an annular cavity 162, having a first window 163 and a second window 164, through which fluid flows at given pressures. As described herein, the LVDT 180 and the single stage servo valve 190 control the position of the MV 160. A first cavity 166 on one side of the spool 161 is under a pressure $P_Q$. A second cavity 167 is disposed on an opposite side of the spool 161, and has a meter pressure $P_M$ from the single stage servo valve 190 as described herein.

In one embodiment, the BV 120 and the PRV 140 operate together, thereby 1) reducing droop in the system 100 for improved metered flow accuracy and 2) providing a regulated pressure for controlling the position of the MV 160. As will be appreciated, even though a valve has been added, it serves double duty, allowing for the elimination of a conventional servo pressure regulating valve. A conventional fuel metering system includes a metering valve, and single stage servo valve, and a pressure regulating valve (whose job is to regulate metering window pressure ($P_1$-$P_2$) by bypassing excess pump flow), and a servo pressure regulating valve (whose job is to regulate servo pressure ($P_R$-$P_D$) across the single stage servo valve). Because of the large variations in bypass flow and system delta pressure ($P_1$-$P_D$), the regulation of $P_1$-$P_2$ can have significant variation. This variation is largely due to a large valve stroke introducing large spring force variations, and the large swing in $P_1$-$P_D$ causing large changes in fluid momentum forces. In addition, the conventional metering valve has several signal pressures making it a very large and complex valve.

The MV 160 is simplified as compared to metering valves in conventional metering valve systems. As such, the number of ports implemented in the system 100 is reduced. As described herein, since $P_1$ is provided for metered flow regulation and is now also needed for MV position control, one port (for $P_D$) has been eliminated as compared to conventional metering systems.

In one embodiment, the system 100 improves the regulation of $P_1$-$P_2$ and reduces complexity of the MV 160. By adding a valve to assist in regulation of $P_1$-$P_2$, the jobs of regulating $P_1$-$P_2$ and bypassing excess pump flow can be split between the BV 120 and the PRV 140. Because the PRV 140 only has to accommodate a small flow under pressure $P_1$, the PRV 140 will have a short stroke, meaning the variation in $P_1$-$P_2$ regulation will be significantly reduced. Typically servo regulation pressure is determined by setting the higher pressure to a given level above the low pressure (i.e., a bottom-up regulator). For example, the basis for setting the pressure in a conventional system sets $P_R$ above $P_D$, using $P_D$ as the basis pressure for the conventional system. The system 100 reverses this scheme by setting the low pressure to a level BELOW the higher pressure (top-down regulator). As such, the pressure $P_Q$ is set with respect to the higher pressure $P_1$, making $P_1$ the basis of the pressure of the system 100.

In one embodiment, similar to conventional metering systems, $P_2$ is set by the downstream components. As such, the PRV 140 sets the value of $P_1$ to a value above $P_2$. The PRV 140 also regulates servo circuit flow from $P_Q$. The BV 120 controls bypass flow from $P_1$ and determines servo pressure regulation ($P_1$-$P_Q$) by setting $P_Q$ to a value below $P_1$.

In one embodiment, if flow under the pressure $P_1$ decreases (such as due to pump speed decreasing), $P_1$-$P_2$ also decreases, thus reducing metered flow across the metering window in the MV 160, that is the first and second windows 163, 164. This pressure drop causes the PRV 140 (which is trying to maintain $P_1$-$P_2$) to close. The closure of the PRV 140 restricts the window 143 ($P_Q$ flow to $P_D$), increasing the $P_Q$ pressure and thus decreasing $P_1$-$P_Q$. Since the BV 120 is trying to maintain $P_1$-$P_Q$, the BV 120 also closes. This closure restricts the window 123 ($P_1$ flow to $P_D$) which increases $P_1$, restoring $P_1$-$P_2$ and thus the overall metered flow in the system 100, as well as restoring $P_1$-$P_Q$ to the pre-determined operational levels of the system 100.

In one embodiment, a regulated servo pressure function can be included into the BV 120 and the PRV 140. By supplying a high $P_1$ pressure to the SSSV 190, and then sending the SSSV 190 return flow to $P_Q$, the SSSV 190 delta pressure is $P_1$-$P_Q$, which is being regulated by the BV 120 and the PRV 140. While there will be more variation in SSSV 190 dP than on typical systems, it is more tolerable to have this variation on the servo pressure (P1-PQ) than on the metering window 162 delta pressure ($P_1$-$P_2$).

As such, the system 100 provides improved metered flow accuracy by using two valves to split the jobs of bypassing excess flow and regulating the metering window 162 delta pressure ($P_1$-$P_2$). As such, the metered flow in the system 100 is improved due to reduced variation in $P_1$-$P_2$.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel metering system, comprising:
   a bypass valve (BV) configured to receive a fuel flow under an incoming fuel pressure and to output a fuel flow under a drain pressure while regulating a servo system delta pressure, the servo system delta pressure being a difference between the incoming fuel pressure and a cavity pressure;
   a pressure regulating valve (PRV) in fluid communication with the BV and configured to receive a fuel flow under an intermediate pressure and to output a fuel flow under the drain pressure while regulating a metering window delta pressure, the metering window delta pressure being a difference between the incoming fuel pressure and an outgoing fuel pressure;
   a metering valve (MV) in fluid communication with the BV and the PRV, and configured to receive the fuel flow under the incoming fuel pressure and to output a fuel flow under the outgoing fuel pressure;
   a single stage servo valve (SSSV) in fluid communication with the BV, the PRV and the MV, and configured to receive the fuel flow under the incoming fuel pressure, and to output the fuel flow under the intermediate pressure, and to output a fuel flow under a modulated pressure; and
   a linear variable differential transformer (LVDT) coupled to the MV.

2. The system as claimed in claim 1 wherein the BV includes a first cavity configured to receive the fuel flow under the intermediate pressure and a second cavity configured to receive a fuel flow under the incoming fuel pressure.

3. The system as claimed in claim 2 wherein the PRV includes a first cavity configured to receive the fuel flow under the outgoing fuel pressure and a second cavity configured to receive a fuel flow under the incoming fuel pressure.

4. The system as claimed in claim 3 wherein the BV and the PRV regulate a pressure difference between the incoming fuel pressure and the outgoing fuel pressure and contribute to a bypass fuel flow under the drain pressure.

5. The system as claimed in claim 1 wherein the BV includes an annular cavity configured to receive the fuel flow under the incoming fuel pressure.

6. The system as claimed in claim 5 wherein the PRV includes an annular cavity configured to receive the fuel flow under the intermediate pressure.

7. The system as claimed in claim 6 wherein the BV and the PRV contribute to a bypass fuel flow under the drain pressure from the annular cavity in the BV and the annular cavity in the PRV.

8. The system as claimed in claim 1 wherein the MV includes a first cavity configured to receive the fuel flow under the intermediate pressure and a second cavity configured to receive the fuel flow under the modulated pressure.

9. The system as claimed in claim 8 wherein the MV includes an annular cavity configured to receive the fuel flow under the incoming fuel pressure and to output the fuel flow under the outgoing fuel pressure.

10. The system as claimed in claim 9 wherein the BV and the PRV regulate a pressure difference between the incoming fuel pressure and the outgoing fuel pressure and contribute to a bypass fuel flow under the drain pressure.

11. The system as claimed in claim 1 wherein the PRV is configured to set the incoming fuel pressure to a value over the outgoing fuel pressure, and to regulate the intermediate pressure.

12. The system as claimed in claim 11 wherein the BV is configured to set the cavity pressure to a value below the incoming fuel pressure.

13. A fuel metering system, comprising:
- a bypass valve (BV) configured to receive a fuel flow under an incoming fuel pressure;
- a pressure regulating valve (PRV) in fluid communication with the BV;
- a metering valve (MV) in fluid communication with the BV and the PRV, and configured to output a fuel flow under an outgoing fuel pressure;
- a single stage servo valve (SSSV) in fluid communication with the BV, the PRV and the MV; and
- a linear variable differential transformer (LVDT) coupled to the SSSV and to the MV,
- wherein the BV and the PRV regulate a pressure difference between the incoming fuel pressure and the outgoing fuel pressure and contribute to a bypass fuel flow under a drain pressure.

14. The system as claimed in claim 13 wherein the BV includes a first cavity configured to receive a fuel flow under an intermediate pressure and a second cavity configured to receive a fuel flow under the incoming fuel pressure.

15. The system as claimed in claim 14 wherein the PRV includes a first cavity configured to receive the fuel flow under the outgoing fuel pressure and a second cavity configured to receive a fuel flow under the incoming fuel pressure.

16. The system as claimed in claim 13 wherein the BV includes an annular cavity configured to receive the fuel flow under the incoming fuel pressure.

17. The system as claimed in claim 16 wherein the PRV includes an annular cavity configured to receive a fuel flow under an intermediate pressure.

18. The system as claimed in claim 13 wherein the MV includes a first cavity configured to receive a fuel flow under an intermediate pressure and a second cavity configured to receive a fuel flow under a modulated pressure.

19. The system as claimed in claim 18 wherein the MV includes an annular cavity configured to receive the fuel flow under the incoming fuel pressure and to output the fuel flow under the outgoing fuel pressure.

20. The system as claimed in claim 13 wherein the PRV is configured to set the incoming pressure to a value over the outgoing fuel pressure, and to regulate an intermediate pressure, and wherein the BV is configured to set the intermediate pressure to a value below the incoming fuel pressure.

* * * * *